United States Patent
Chen et al.

(10) Patent No.: US 11,958,604 B2
(45) Date of Patent: Apr. 16, 2024

(54) UNMANNED AERIAL VEHICLE AND METHOD FOR CONTROLLING GIMBAL THEREOF

(71) Applicant: AUTEL ROBOTICS CO., LTD., Guangdong (CN)

(72) Inventors: Gang Chen, Guangdong (CN); Tianbao Zhang, Guangdong (CN); Xianhong Jiang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 383 days.

(21) Appl. No.: 17/244,137

(22) Filed: Apr. 29, 2021

(65) Prior Publication Data

US 2021/0245879 A1    Aug. 12, 2021

Related U.S. Application Data

(63) Continuation of application No. PCT/CN2018/113018, filed on Oct. 31, 2018.

(51) Int. Cl.
*B64C 39/02* (2023.01)
*B64U 10/13* (2023.01)
(Continued)

(52) U.S. Cl.
CPC ......... *B64C 39/024* (2013.01); *G05D 1/0094* (2013.01); *G05D 1/0808* (2013.01); *B64U 10/13* (2023.01); *B64U 2101/30* (2023.01)

(58) Field of Classification Search
CPC .............. B64C 39/024; B64U 2101/30; G05D 1/0094; G05D 1/0808
See application file for complete search history.

(56) References Cited

U.S. PATENT DOCUMENTS

| | | | |
|---|---|---|---|
| 2017/0010611 A1* | 1/2017 | Tao ........................ | B64U 20/87 |
| 2018/0088581 A1* | 3/2018 | Freeman ................ | H04N 7/185 |
| 2018/0155024 A1 | 6/2018 | Lee et al. | |

FOREIGN PATENT DOCUMENTS

| | | | |
|---|---|---|---|
| CN | 106791354 A | 5/2017 | |
| CN | 106828958 A | 6/2017 | |

(Continued)

OTHER PUBLICATIONS

International Search Report dated Jul. 26, 2019; PCT/2018/113018 with English Translation.

*Primary Examiner* — Aniss Chad
*Assistant Examiner* — Christine Nguyen Huynh
(74) *Attorney, Agent, or Firm* — Frank Gao, Esq (57) ABSTRACT

The present invention discloses an unmanned aerial vehicle and a method for controlling a gimbal thereof. The method for controlling a gimbal includes: generating, by a flight control system, a yaw angular speed instruction of the unmanned aerial vehicle; and controlling, by a gimbal control system, a yaw axis motor of the gimbal according to the yaw angular speed instruction of the unmanned aerial vehicle. In the present invention, the yaw axis motor of the gimbal is jointly controlled by the flight control system and the gimbal control system, so that advantages of high-precision control and quick response of the gimbal control system are maximized. The advantages are used for compensating for deficiencies of the flight control system in yaw control, thereby improving the stability of a yaw channel of the gimbal, and completely resolving frame freezing of an aerial video when the unmanned aerial vehicle yaws at a low speed.

22 Claims, 7 Drawing Sheets

(51) Int. Cl.
    *B64U 101/30*     (2023.01)
    *G05D 1/00*     (2006.01)
    *G05D 1/08*     (2006.01)

(56) References Cited

FOREIGN PATENT DOCUMENTS

| | | | | |
|---|---|---|---|---|
| CN | 106873641 A | | 6/2017 | |
| CN | 106878613 A | | 6/2017 | |
| CN | 107074348 A | * | 8/2017 | ............. B64C 19/00 |
| CN | 206394875 U | | 8/2017 | |

* cited by examiner

UNMANNED AERIAL VEHICLE AND METHOD FOR CONTROLLING GIMBAL THEREOF

CROSS REFERENCE

This application is a continuation application of International Application No. PCT/CN2018/113018, filed on Oct. 31, 2018, which is incorporated herein by reference in its entirely.

BACKGROUND

Technical Field

The present invention relates to the field of unmanned aerial vehicle technologies, and in particular, to an unmanned aerial vehicle and a method for controlling a gimbal thereof.

Related Art

An aerial-photography unmanned aerial vehicle includes a consumer-grade aerial-photography unmanned aerial vehicle and a professional aerial-photography unmanned aerial vehicle. The quality of aerial photography of both the consumer-grade aerial-photography unmanned aerial vehicle and the professional aerial-photography unmanned aerial vehicle depend on control effects of a body and a gimbal of the unmanned aerial vehicle. A flight control system (FCS) is the basic premise to ensure stable flight of an unmanned aerial vehicle. A gimbal control system (GCS) is configured to improve the quality of an aerial video, isolate high-frequency vibration of the body through a vibration isolation system of the gimbal, and has a control precision far higher than that of the FCS. In the existing aerial-photography unmanned aerial vehicle, the GCS and the FCS are independent. That is, a pitch or roll channel of the GCS does not respond to a change in a posture of the FCS, and a yaw angle of the GCS is of first-order convergence to a yaw angle of the FCS. Such a concept of GCS/FCS independent control has disadvantages as follows:
1. The FCS has no permission to control the GCS, and the GCS obtains only information about an actual yaw angle/yaw angular speed of the unmanned aerial vehicle and has no feedback information for performing real-time interaction with the FCS.
2. The FCS has a small yaw control torque, and there is channel coupling among yaw control, pitch control and roll control. When external interference occurs, the rotation speed of a yaw channel of the FCS is not uniform, resulting in an unsmooth aerial video. In particular, there is serious video freezing when the FCS controls the unmanned aerial vehicle to yaw at a low rotation speed.
3. The control of a yaw channel of the gimbal is affected by the control of the yaw angle of the unmanned aerial vehicle, and the advantage of high-precision control of the GCS is not effectively exerted, resulting in an increase in the pressure of control by the FCS.

SUMMARY

Based on this, for the foregoing problems in the prior art, an unmanned aerial vehicle and a method for controlling a gimbal thereof are provided, to eliminate video freezing by jointly controlling a yaw axis motor of a gimbal by using an FCS and a GCS.

To resolve the foregoing problems, the present invention provides a method for controlling a gimbal of an unmanned aerial vehicle, where an unmanned aerial vehicle includes an FCS and a GCS configured to control a gimbal, and the method includes:
generating, by the FCS, a yaw angular speed instruction of the unmanned aerial vehicle; and
controlling, by the GCS, a yaw axis motor of the gimbal according to the yaw angular speed instruction of the unmanned aerial vehicle.

In an embodiment of the present invention, the controlling, by the GCS, a yaw axis motor of the gimbal according to the yaw angular speed instruction of the unmanned aerial vehicle includes:
determining whether the yaw angular speed instruction input to the unmanned aerial vehicle is zero;
if the yaw angular speed instruction input to the unmanned aerial vehicle is not zero,
obtaining, by the GCS, an actual yaw angular speed of the gimbal;
generating, by the GCS, a yaw axis motor control instruction of the gimbal according to the yaw angular speed instruction input to the unmanned aerial vehicle and the actual yaw angular speed of the gimbal;
obtaining, by the GCS, an additional yaw axis motor control instruction of the gimbal, the additional yaw axis motor control instruction being used to control the yaw axis motor of the gimbal, to enable a sight of an imaging device mounted on the gimbal to coincide with a heading of the unmanned aerial vehicle;
generating, by the GCS, a yaw axis motor control variable of the gimbal according to the yaw axis motor control instruction of the gimbal and the additional yaw axis motor control instruction of the gimbal; and
controlling the yaw axis motor of the gimbal according to the yaw axis motor control variable of the gimbal.

In an embodiment of the present invention, the obtaining, by the GCS, an additional yaw axis motor control instruction of the gimbal includes:
obtaining, by the GCS, an actual yaw angle of the gimbal and an actual yaw angle of the unmanned aerial vehicle; and
generating, by the GCS, the additional yaw axis motor control instruction of the gimbal according to the actual yaw angle of the gimbal and the actual yaw angle of the unmanned aerial vehicle.

In an embodiment of the present invention, the method further includes:
if the yaw angular speed instruction input to the unmanned aerial vehicle is zero,
obtaining, by the GCS, an actual yaw angle of the unmanned aerial vehicle and an actual yaw angle of the gimbal;
generating, by the GCS, a yaw angular speed control instruction of the gimbal according to the actual yaw angle of the unmanned aerial vehicle and the actual yaw angle of the gimbal;
obtaining, by the GCS, an actual yaw angular speed of the gimbal;
generating, by the GCS, a yaw axis motor control variable of the gimbal according to the yaw angular speed control instruction of the gimbal and the actual yaw angular speed of the gimbal; and controlling, by the GCS, the yaw axis motor of the gimbal according to the yaw axis motor control variable of the gimbal.

In an embodiment of the present invention, the generating, by the FCS, a yaw angular speed instruction of the unmanned aerial vehicle includes:

obtaining, by the FCS, at least one of a position instruction and a sight instruction that are input to the unmanned aerial vehicle; and generating, by the FCS, the yaw angular speed instruction of the unmanned aerial vehicle according to at least one of the position instruction and the sight instruction that are input to the unmanned aerial vehicle.

In an embodiment of the present invention, the generating, by the FCS, a yaw angular speed instruction of the unmanned aerial vehicle includes:

obtaining, by the FCS, at least one of a velocity instruction and a sight change rate instruction that are input to the unmanned aerial vehicle; and generating, by the FCS, the yaw angular speed instruction of the unmanned aerial vehicle according to at least one of the velocity instruction and the sight change rate instruction that are input to the unmanned aerial vehicle.

In an embodiment of the present invention, the method further includes:

controlling, by the GCS, a pitch axis motor and a roll axis motor of the gimbal according to an overhead shot angle instruction input to the gimbal and output status information of the gimbal, the output status information of the gimbal including an actual posture angle and an actual posture angular speed of the gimbal.

In an embodiment of the present invention, the actual posture angle of the gimbal includes an actual pitch angle of the gimbal, and the actual posture angular speed of the gimbal includes an actual pitch angular speed of the gimbal; and the controlling, by the GCS, a pitch axis motor and a roll axis motor of the gimbal according to an overhead shot angle instruction input to the gimbal and output status information of the gimbal includes:

generating, by the GCS, a pitch axis motor control variable of the gimbal according to the overhead shot angle instruction of the gimbal, and the actual pitch angle and the actual pitch angular speed of the gimbal; and controlling the pitch axis motor of the gimbal according to the pitch axis motor control variable of the gimbal.

In an embodiment of the present invention, the actual posture angle of the gimbal further includes an actual roll angle of the gimbal, and the actual posture angular speed of the gimbal further includes an actual roll angular speed of the gimbal; and the controlling, by the GCS, a pitch axis motor and a roll axis motor of the gimbal according to an overhead shot angle instruction input to the gimbal and output status information of the gimbal includes:

generating, by the GCS, a roll axis motor control variable of the gimbal according to the overhead shot angle instruction of the gimbal, and the actual roll angle and the actual roll angular speed of the gimbal; and controlling, by the GCS, the roll axis motor of the gimbal according to the roll axis motor control variable of the gimbal.

In an embodiment of the present invention, a manner in which the GCS obtains the overhead shot angle instruction of the gimbal includes:

obtaining, by the GCS, the overhead shot angle instruction of the gimbal transmitted by a remote control or an intelligent terminal.

In an embodiment of the present invention, the method further includes:

controlling, by the FCS, a posture of the unmanned aerial vehicle according to the output status information of the gimbal.

In an embodiment of the present invention, the controlling, by the FCS, a posture of the unmanned aerial vehicle according to the output status information of the gimbal includes:

generating, by the FCS, a posture angle limit value of the unmanned aerial vehicle according to the actual posture angle of the gimbal;

obtaining, by the FCS, an actual posture angle of the unmanned aerial vehicle and a posture angle instruction input to the unmanned aerial vehicle;

generating, by the FCS, a posture angular speed control instruction of the unmanned aerial vehicle according to the posture angle limit value of the unmanned aerial vehicle, the posture angle instruction input to the unmanned aerial vehicle and the actual posture angle of the unmanned aerial vehicle;

generating, by the FCS, a posture angular speed limit value of the unmanned aerial vehicle according to the actual posture angular speed of the gimbal;

obtaining, by the FCS, an actual posture angular speed of the unmanned aerial vehicle and the yaw angular speed instruction input to the unmanned aerial vehicle;

generating, by the FCS, a motor control instruction of the unmanned aerial vehicle according to the posture angular speed control instruction of the unmanned aerial vehicle, the posture angular speed limit value of the unmanned aerial vehicle, the yaw angular speed instruction input to the unmanned aerial vehicle and the actual posture angular speed of the unmanned aerial vehicle; and controlling, by the FCS, the posture of the unmanned aerial vehicle according to the motor control instruction of the unmanned aerial vehicle.

To resolve the technical problem, the present invention further provides an unmanned aerial vehicle, including:

a body;

an arm, connected to the body;

a power apparatus, disposed on the arm;

a gimbal, connected to the body;

an FCS, disposed on the body; and a GCS, disposed on the gimbal or the body and configured to control the gimbal, the FCS being configured to generate a yaw angular speed instruction of the unmanned aerial vehicle; and the GCS being configured to:

control a yaw axis motor of the gimbal according to the yaw angular speed instruction of the unmanned aerial vehicle generated by the FCS.

In an embodiment of the present invention, the GCS is specifically configured to:

determine whether the yaw angular speed of the unmanned aerial vehicle is zero;

if the yaw angular speed instruction of the unmanned aerial vehicle is not zero, obtain an actual yaw angular speed of the gimbal;

generate a yaw axis motor control instruction of the gimbal according to the yaw angular speed instruction input to the unmanned aerial vehicle and the actual yaw angular speed of the gimbal;

obtain an additional yaw axis motor control instruction of the gimbal, the additional yaw axis motor control instruction being used to control the yaw axis motor of the gimbal, to enable a sight of an imaging device mounted on the gimbal to coincide with a heading of the unmanned aerial vehicle;

generate a yaw axis motor control variable of the gimbal according to the yaw axis motor control instruction of the gimbal and the additional yaw axis motor control instruction of the gimbal; and control the yaw axis motor of the gimbal according to the yaw axis motor control variable of the gimbal.

In an embodiment of the present invention, the GCS is specifically configured to:

obtain an actual yaw angle of the gimbal and an actual yaw angle of the unmanned aerial vehicle; and generate the additional yaw axis motor control instruction of the gimbal according to the actual yaw angle of the gimbal and the actual yaw angle of the unmanned aerial vehicle.

In an embodiment of the present invention, when the yaw angular speed instruction input to the unmanned aerial vehicle is zero, the GCS is further configured to:

obtain an actual yaw angle of the unmanned aerial vehicle and an actual yaw angle of the gimbal;

generate a yaw angular speed control instruction of the gimbal according to the actual yaw angle of the unmanned aerial vehicle and the actual yaw angle of the gimbal;

obtain an actual yaw angular speed of the gimbal;

generate a yaw axis motor control variable of the gimbal according to the yaw angular speed control instruction of the gimbal and the actual yaw angular speed of the gimbal; and control the yaw axis motor of the gimbal according to the yaw axis motor control variable of the gimbal.

In an embodiment of the present invention, the FCS is specifically configured to:

obtain at least one of a position instruction and a sight instruction of the unmanned aerial vehicle; and generate the yaw angular speed instruction of the unmanned aerial vehicle according to at least one of the position instruction and the sight instruction of the unmanned aerial vehicle.

In an embodiment of the present invention, the FCS is specifically configured to:

obtain at least one of a velocity instruction and a sight change rate instruction of the unmanned aerial vehicle; and generate the yaw angular speed instruction of the unmanned aerial vehicle according to at least one of the velocity instruction and the sight change rate instruction of the unmanned aerial vehicle.

In an embodiment of the present invention, the GCS is further configured to:

control a pitch axis motor and a roll axis motor of the gimbal according to an overhead shot angle instruction input to the gimbal and output status information of the gimbal, the output status information of the gimbal including an actual posture angle and an actual posture angular speed of the gimbal.

In an embodiment of the present invention, the GCS is specifically configured to:

generate a pitch axis motor control variable of the gimbal according to the overhead shot angle instruction of the gimbal, and the actual pitch angle and the actual pitch angular speed of the gimbal; and control the pitch axis motor of the gimbal according to the pitch axis motor control variable of the gimbal.

In an embodiment of the present invention, the GCS is further configured to:

generate a roll axis motor control variable of the gimbal according to the overhead shot angle instruction of the gimbal, and an actual roll angle and an actual roll angular speed of the gimbal; and control the roll axis motor of the gimbal according to the roll axis motor control variable of the gimbal.

In an embodiment of the present invention, the GCS is specifically configured to obtain the overhead shot angle instruction of the gimbal transmitted by a remote control or an intelligent terminal.

In an embodiment of the present invention, the FCS is further configured to:

control a posture of the unmanned aerial vehicle according to the output status information of the gimbal.

In an embodiment of the present invention, the FCS is specifically configured to:

generate a posture angle limit value of the unmanned aerial vehicle according to the actual posture angle of the gimbal;

obtain an actual posture angle of the unmanned aerial vehicle and a posture angle instruction input to the unmanned aerial vehicle;

generate a posture angular speed control instruction of the unmanned aerial vehicle according to the posture angle limit value of the unmanned aerial vehicle, the posture angle instruction input to the unmanned aerial vehicle and the actual posture angle of the unmanned aerial vehicle;

generate a posture angular speed limit value of the unmanned aerial vehicle according to the actual posture angular speed of the gimbal;

obtain an actual posture angular speed of the unmanned aerial vehicle and the yaw angular speed instruction input to the unmanned aerial vehicle;

generate a motor control instruction of the unmanned aerial vehicle according to the posture angular speed control instruction of the unmanned aerial vehicle, the posture angular speed limit value of the unmanned aerial vehicle, the yaw angular speed instruction input to the unmanned aerial vehicle and the actual posture angular speed of the unmanned aerial vehicle; and control the posture of the unmanned aerial vehicle according to the motor control instruction of the unmanned aerial vehicle.

In the present invention, the yaw axis motor of the gimbal is jointly controlled by the FCS and the GCS, so that advantages of high-precision control and quick response of the GCS are maximized. The advantages are used for compensating for deficiencies of the FCS in yaw control, thereby improving the stability of a yaw channel of the gimbal, and completely resolving frame freezing of an aerial video when the unmanned aerial vehicle yaws at a low speed.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
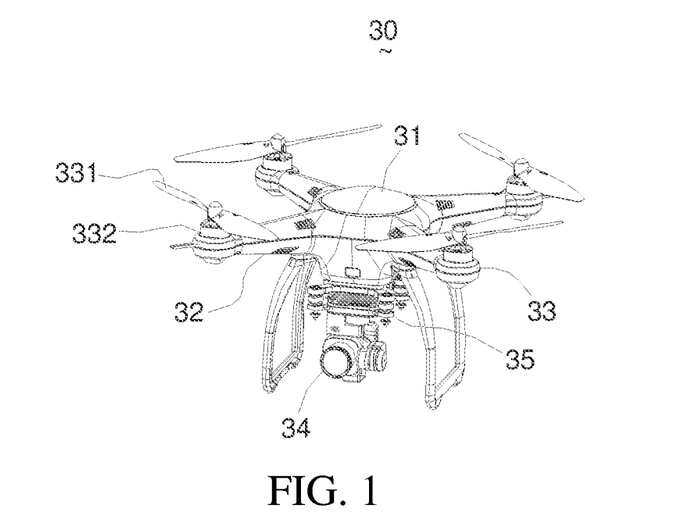
FIG. 1 is a schematic structural diagram of an embodiment of an unmanned aerial vehicle according to the present invention.

As shown in FIG. 1, an unmanned aerial vehicle 30 provided in the present invention includes a body 31, an arm 32 connected to the body 31, a power apparatus 33 disposed on an end of the arm 32, a gimbal 35 connected to the body 31, an imaging device 34 connected to the gimbal 35, an FCS disposed in the body 21, an inertial measurement unit (IMU), a global positioning system (GPS) and a GCS configured to control the gimbal 35.

In this embodiment, there are four arms 32, that is, the unmanned aerial vehicle 30 is a four-rotor aircraft. In other possible embodiments, there may be alternatively three, six, eight, ten arms 32, and the like. The unmanned aerial vehicle 30 may be alternatively another movable object that needs to perform wind speed estimation or alarming on a flight environment of the object, such as an industrial unmanned aerial vehicle, a manned aircraft, a model airplane, an unmanned airship, a fixed-wing unmanned aerial vehicle and an unmanned hot air balloon. The arm 32 may be fixedly connected to or integrally formed with the body 31, or may be folded relative to the body 31.

The power apparatus 33 includes a motor 332 disposed on an end of the arm 32 and a propeller 331 connected to a rotation shaft of the motor 332. The rotation shaft of the motor 332 rotates to drive the propeller 331 to rotate, so as to provide a pulling force required for flying for the unmanned aerial vehicle 30.

The imaging device 34 may be a laser sensor, an RGBD depth camera, a camera or the like.

A vision system may include a binocular and/or monocular camera and a vision chip. The vision chip is disposed inside the body and is in communication connection with the FCS. The binocular and/or monocular camera may be disposed at any one or two positions on the front, bottom and rear of the body, or may be disposed at any other suitable positions.

The IMU (not shown) is an apparatus configured to measure a three-axis posture angle and an acceleration of the unmanned aerial vehicle. The IMU may include a three-axis gyroscope and accelerometers in three directions, so as to measure posture angle information and acceleration information of the unmanned aerial vehicle in a three-dimensional space. The IMU may be disposed inside the body 31 of the unmanned aerial vehicle 30. For example, the IMU may be disposed at a gravity center position of the unmanned aerial vehicle 30, or may be disposed at another suitable position.

The GPS (not shown) is configured to measure position information and velocity information of the unmanned aerial vehicle in the three-dimensional space. The GPS may be disposed on the body 31 of the unmanned aerial vehicle 30, or may be disposed on the arm 32. In some embodiments, the body 31 may further include an undercarriage, and the GPS may be alternatively disposed on the undercarriage, to prevent interference from other electronic devices.

The FCS (not shown) is configured to stabilize a flight posture of the unmanned aerial vehicle 30 and control the unmanned aerial vehicle 30 to fly autonomously or semi-autonomously. The FCS can acquire, in real time, flight status data measured by sensors of the unmanned aerial vehicle, receive a control instruction and data transmitted by a control terminal, and output the control instruction and the data to an actuator (for example, a power apparatus), to control the flight posture or an execution task of the unmanned aerial vehicle. In the embodiments of the present invention, the FCS may include a flight control chip, a processor in communication connection with the flight control chip, and other necessary units. The FCS may be disposed inside the body 31 of the unmanned aerial vehicle 30, or may be disposed on an outer surface of the body 31 or at any other possible positions.

In the embodiments of the present invention, the imaging device 34 is connected to the body 31 through the gimbal 35. The GCS controls the gimbal 35 to allow the imaging device 34 to rotate about at least one axis relative to the unmanned aerial vehicle 30, and is configured to reduce and even eliminate vibration transmitted by the power apparatus 33 to the imaging device 34, so as to ensure that the imaging device 34 can photograph stable and clear images or videos. In an embodiment of the present invention, the gimbal 35 is a three-axis gimbal, that is, the gimbal 35 allows the imaging device 34 to rotate about a yaw axis, a roll axis, and a pitch axis. Therefore, correspondingly, the gimbal 35 has a yaw axis motor configured to drive the imaging device 34 to rotate about the yaw axis, a roll axis motor configured to drive the imaging device 34 to rotate about the roll axis and a pitch axis motor configured to drive the imaging device 34 to rotate about the pitch axis.

In the embodiments of the present invention, the FCS and the GCS can work together to improve the quality of aerial photography of the imaging device 34 when the unmanned aerial vehicle yaws at a low speed in various states (such as hovering, normal flight, and extreme flight) and the gimbal 35 controls the imaging device 34 to rotate about the yaw axis.

Therefore, the present invention provides a joint control solution by using the FCS and the GCS, which implements high-precision control of aerial photography, improves the stability of aerial photography, and ensures the uniformity of the rotation speed of a yaw channel of the gimbal when the unmanned aerial vehicle yaws at a low rotation speed in a yaw channel, thereby completely resolving video freezing during aerial photography at a low rotation speed.

Figure 2:
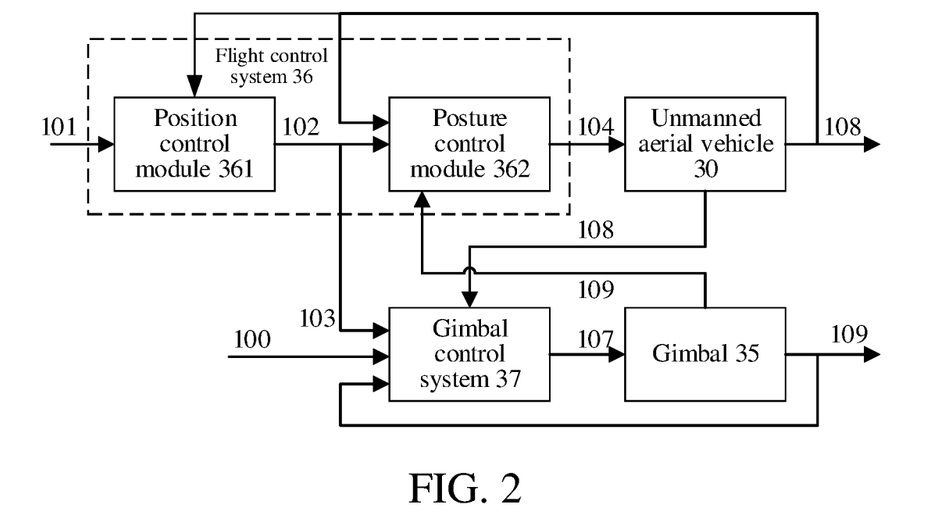
FIG. 2 is a block diagram of control principles of an FCS and a GCS in an unmanned aerial vehicle according to the present invention.

FIG. 2 is a structural block diagram of joint control by using an FCS 36 and a GCS 37 of an unmanned aerial vehicle according to the present invention. The control mechanism shown in FIG. 2 is described by using several parts below.

Figure 3:
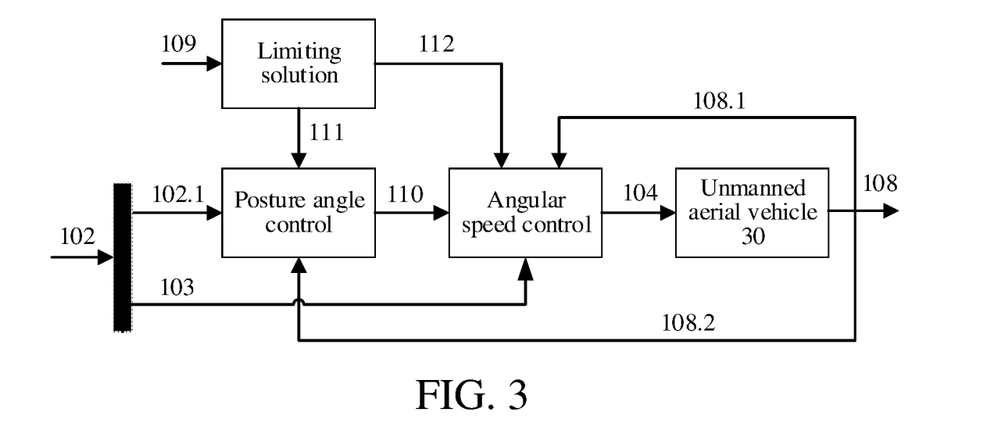
FIG. 3 is a block diagram of a control principle of an FCS in an unmanned aerial vehicle according to the present invention.

Control of the unmanned aerial vehicle by the FCS:

As shown in FIG. 2 and FIG. 3, the FCS 36 includes a position control portion and a posture control portion. Therefore, it may be considered that the FCS 36 includes a position control module 361 and a posture control module 362. The position control module 361 is configured to control a position and/or a velocity of the unmanned aerial vehicle 30. The posture control module 362 is configured to control a posture of the unmanned aerial vehicle 30.

The FCS 36 obtains a control instruction 101 input to the unmanned aerial vehicle 30 by a vision system, an intelligent control terminal, a remote control or a navigation system of the unmanned aerial vehicle 30. The position control module 361 outputs a control instruction 102 according to the control instruction 101 and output status information 108 of the unmanned aerial vehicle 30.

Figure 4:
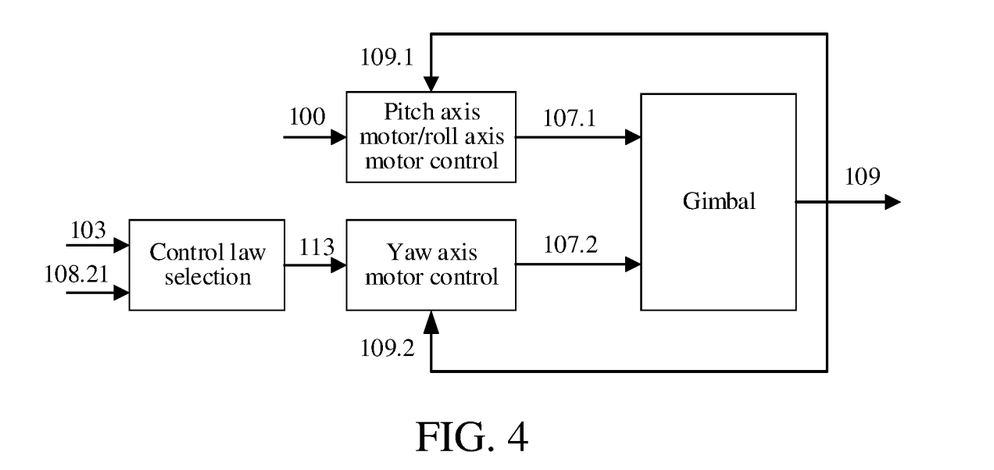
FIG. 4 is a block diagram of a control principle of a GCS in an unmanned aerial vehicle according to the present invention.

The control instruction 101 includes at least one of a position instruction and a velocity instruction of the unmanned aerial vehicle 30. In other possible embodiments, the control instruction 101 may further include at least one of a sight instruction and a sight change rate instruction. The control instruction 102 includes a posture angle instruction 102.1 of the unmanned aerial vehicle 30, a pushing force instruction of the motor and a yaw angular speed instruction 103 input to the unmanned aerial vehicle. The output status information 108 of the unmanned aerial vehicle 30 includes an actual velocity of the unmanned aerial vehicle, an actual posture angle 108.2 of the unmanned aerial vehicle (which includes an actual roll angle, an actual pitch angle and actual yaw angle 108.21 of the unmanned aerial vehicle (as shown in FIG. 4)) and an actual posture angular speed 108.1 of the unmanned aerial vehicle (which includes an actual roll angular speed, an actual pitch angular speed and an actual yaw angular speed of the unmanned aerial vehicle).

The posture control module 362 outputs a control instruction 104 according to the control instruction 102, the output status information 108 of the unmanned aerial vehicle 30 and output status information 109 of the gimbal 35, to control an actuator (namely, a power apparatus 33) of the unmanned aerial vehicle 30, so as to control the posture of the unmanned aerial vehicle.

In an embodiment of the present invention, the control instruction 104 is a control signal used to control the motor of the unmanned aerial vehicle 30. In other embodiments, when the unmanned aerial vehicle is a fixed-wing aircraft or a mixed-wing aircraft, the control instruction 104 may be alternatively a pushing force and a rudder angle of the fixed-wing aircraft or a mixed control variable of the mixed-wing aircraft. The output status information 109 of the gimbal 35 includes an actual posture angle and an actual posture angular speed of the gimbal. Specifically, the output status information 109 of the gimbal 35 may be divided into status information 109.1 and status information 109.2 (as shown in FIG. 4). The status information 109.1 includes an actual pitch angle, an actual pitch angular speed, an actual roll angle and an actual roll angular speed of the gimbal 35. The status information 109.2 includes an actual yaw angle 109.21 and an actual yaw angular speed 109.22 of the gimbal 35.

It should be noted that sensitivity of the gimbal 35 to the posture of the unmanned aerial vehicle 30 varies depending on different aerial photography angles of the gimbal 35. In the present invention, for different aerial photography angles of the gimbal 35, a limiting condition of the posture angle and/or a posture angular speed of the unmanned aerial vehicle 30 may be dynamically adjusted, to ensure high precision and stability of the gimbal. Because the gimbal 35 is subject to different interferences in different flight states, and especially during an extreme flight, the gimbal 35 is subject to a significantly apparent interference, a flight posture of the unmanned aerial vehicle 30 needs to be limited, which helps improve the stability of the gimbal. For example, when an aerial photography angle of the gimbal 35 is −90° to 75°, a pitch angle of the unmanned aerial vehicle 30 is limited to ±20°. When the aerial photography angle of the gimbal 35 is −10° to 0°, the pitch angle of the unmanned aerial vehicle 30 is limited to ±25°. In other situations, the pitch angle of the unmanned aerial vehicle 30 is limited to ±30°.

Specifically, as shown in FIG. 3, the FCS 36 may automatically generate a posture angle limit value 111 of the unmanned aerial vehicle and a posture angular speed limit value 112 of the unmanned aerial vehicle according to the output status information 109 of the gimbal 35, so as to limit the posture of the unmanned aerial vehicle 30.

The posture control module 362 generates a posture angular speed control instruction 110 of the unmanned aerial vehicle 30 according to the posture angle instruction 102.1 in the control instruction 102, the actual posture angle 108.2 of the unmanned aerial vehicle and the posture angle limit value 111 of the unmanned aerial vehicle.

The posture control module 362 generates a motor control instruction 104 according to the posture angular speed control instruction 110 of the unmanned aerial vehicle, the yaw angular speed instruction 103 of the unmanned aerial vehicle, the posture angular speed limit value 112 of the unmanned aerial vehicle and the actual posture angular speed 108.1 of the unmanned aerial vehicle, and controls the posture of the unmanned aerial vehicle according to the motor control instruction 104.

In an embodiment of the present invention, the posture angle instruction 102.1 mainly includes a pitch angle instruction and a roll angle instruction. In other embodiments, the posture angle instruction 102.1 may alternatively include a yaw angle instruction. The actual posture angle 108.2 of the unmanned aerial vehicle mainly includes an actual pitch angle and an actual roll angle, and may further include an actual yaw angle. The posture angle limit value 111 of the unmanned aerial vehicle mainly includes a pitch angle limit value and a roll angle limit value. The posture angle limit value 111 of the unmanned aerial vehicle may be generated according to the actual posture angle of the gimbal (which mainly includes the actual pitch angle and the actual roll angle of the gimbal) in the output status information 109 of the gimbal. The posture angular speed control instruction 110 of the unmanned aerial vehicle mainly includes a pitch angular speed control instruction and a roll angular speed control instruction. The posture angular speed limit value 112 of the unmanned aerial vehicle mainly includes a pitch angular speed limit value, a roll angular speed limit value and a yaw angular speed limit value. The posture angular speed limit value 112 of the unmanned aerial vehicle may be generated according to the actual posture angular speed of the gimbal 35 in the output status information 109 of the gimbal.

Figure 5:
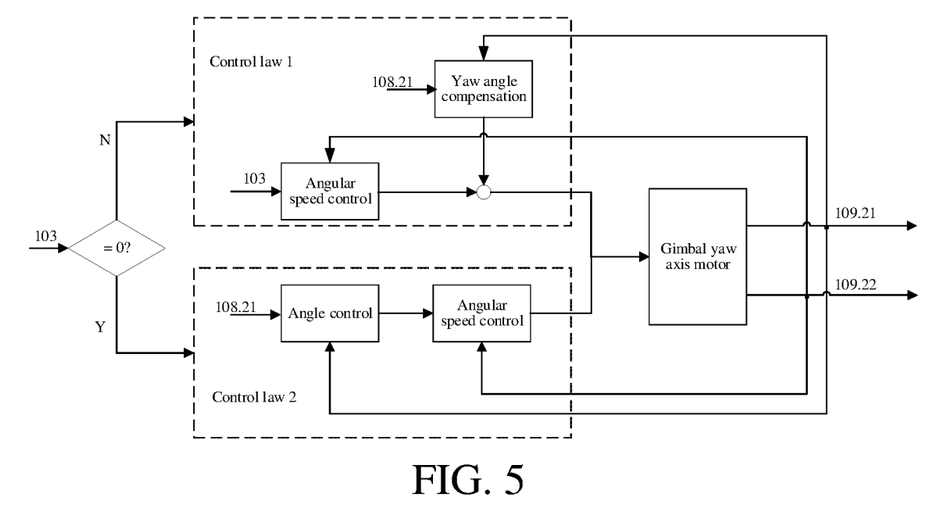
FIG. 5 is a principle block diagram of jointly controlling, by an FCS and a GCS in an unmanned aerial vehicle, a yaw axis motor of a gimbal according to the present invention.

Joint Control of the Gimbal by the FCS and the GCS:

As shown in FIG. 4, control of gimbal 35 by the GCS 37 may be divided into two parts. One part is to control the yaw axis motor of the gimbal 35, and the other part is to control the pitch axis motor and the roll axis motor of the gimbal 35. The control of the yaw axis motor of the gimbal 35 is jointly implemented by the FCS 36 and the GCS 37. FIG. 5 is a principle block diagram of jointly controlling, by the FCS 36 and the GCS 37, the yaw axis motor of a gimbal 35 according to the present invention.

As shown in FIG. 5, the FCS 36 first transmits the yaw angular speed instruction 103 input to the unmanned aerial vehicle and in the control instruction 102 to the GCS 37. After obtaining the yaw angular speed instruction 103 input to the unmanned aerial vehicle, the GCS 37 performs logical determination. Whether the yaw angular speed instruction 103 input to the unmanned aerial vehicle is zero is determined.

When the yaw angular speed instruction 103 input to the unmanned aerial vehicle is not zero, a control permission of the yaw axis motor of the gimbal 35 is given to the FCS 36. A weight of a yaw angular speed error of the gimbal 35 is relatively large, and a yaw angular error is only used for compensation, and has a low weight. Specifically, in this case, because the yaw angular speed instruction 103 input to the unmanned aerial vehicle is not zero, the GCS 37 selects a control law 1 (which is an algorithm used by the GCS to form a control instruction, and describes a function relationship between a controlled status variable and an input signal of the system). The GCS 37 generates a yaw axis motor control instruction of the gimbal 35 according to the yaw angular speed instruction 103 of the unmanned aerial vehicle and the actual yaw angular speed 109.22 of the gimbal 35. Then, the GCS 37 generates an additional yaw axis motor control instruction of the gimbal 35, generates a yaw axis motor control variable of the gimbal 35 according to the yaw axis motor control instruction of the gimbal 35 and the additional yaw axis motor control instruction of the gimbal 35 and controls the yaw axis motor of the gimbal according to the yaw axis motor control variable.

In an embodiment of the present invention, the additional yaw axis motor control instruction of the gimbal 35 refers to a difference between the actual yaw angle 109.21 of the gimbal and the actual yaw angle 108.21 of the unmanned aerial vehicle. The additional yaw axis motor control instruction of the gimbal is introduced to enable a sight of the imaging device 34 mounted on the gimbal 35 to coincide with or be in consistent with a heading of the unmanned aerial vehicle.

The yaw angular speed instruction 103 of the unmanned aerial vehicle reflects a control expectation of the FCS for a yaw channel of the unmanned aerial vehicle. The GCS 37 controls the yaw axis motor of the gimbal by using features of high-precision control and quick response of the GCS 37 and the yaw angular speed instruction 103 of the unmanned aerial vehicle given by the FCS. Therefore, advantages of high-precision control and quick response of the GCS are maximized, thereby improving the stability of the yaw axis of the gimbal, and further eliminating frame freezing in the imaging device mounted on the gimbal in a yaw axial direction.

As shown in FIG. 5, when the yaw angular speed instruction 103 input to the unmanned aerial vehicle is zero, the control permission of the yaw axis motor of the gimbal 35 is given to the GCS 37. The GCS 37 selects a control law 2, that is, the GCS 37 directly controls the yaw axis motor of the gimbal 35, and the yaw axis motor of the gimbal 35 is not affected by the instruction output by the FCS 36. In this case, the GCS 37 obtains the actual yaw angle 108.21 of the unmanned aerial vehicle and the actual yaw angle 109.21 of the gimbal and generates the yaw angular speed control instruction of the gimbal according to the actual yaw angle 108.21 of the unmanned aerial vehicle and the actual yaw angle 109.21 of the gimbal. Then, the GCS obtains the actual yaw angular speed 109.22 of the gimbal and finally generates a yaw axis motor control variable of the gimbal 35 according to the yaw angular speed control instruction of the gimbal and the actual yaw angular speed 109.22 of the gimbal, to control the yaw axis motor of the gimbal 35. In this case, a yaw angle of the gimbal is of first-order convergence to a yaw angle of the unmanned aerial vehicle.

It should be noted that regardless of the GCS 37 selects the control law 1 or the control law 2, control permissions of the pitch axis motor and the roll axis motor of the gimbal 35 always pertain to the GCS 37.

As shown in FIG. 4, the control of the pitch axis motor and the roll axis motor by the GCS 37 is specifically that: the GCS 37 obtains an overhead shot angle instruction 100 input to the gimbal 35, and an actual pitch angle and an actual pitch angular speed of the gimbal, generates a pitch axis motor control variable of the gimbal according to the overhead shot angle instruction 100 of the gimbal 35, and the actual pitch angle and the actual pitch angular speed of the gimbal and controls the pitch axis motor of the gimbal 35 according to the pitch axis motor control variable.

Similarly, the GCS 37 obtains the overhead shot angle instruction 100 input to the gimbal 35, and an actual roll angle and an actual roll angular speed of the gimbal, generates a roll axis motor control variable of the gimbal according to the overhead shot angle instruction 100 of the gimbal, and the actual roll angle and the actual roll angular speed of the gimbal, and controls the roll axis motor of the gimbal 35 according to the roll axis motor control variable.

In an embodiment of the present invention, the overhead shot angle instruction 100 of the gimbal 35 may be transmitted by a remote control or an intelligent terminal (such as an app on a mobile phone or a tablet computer).

The status information 109.1 in FIG. 4 includes the actual pitch angle, the actual pitch angular speed, the actual roll angle and the actual roll angular speed of the gimbal 35. A control instruction 107.1 includes the pitch axis motor control variable of the gimbal and the roll axis motor control variable of the gimbal. A control instruction 107.2 includes the yaw axis motor control variable of the gimbal.

In such a solution in which the FCS and the GCS jointly control the yaw axis motor of the gimbal, deficiencies of the FCS in yaw control are compensated by skillfully using characteristics of high precision and quick response of the GCS, so that advantages of high-precision control and quick response of the GCS are maximized. The advantages are used for compensating for deficiencies of the FCS in yaw control, thereby improving the stability of a yaw channel of the gimbal, and completely resolving frame freezing of an aerial video when the unmanned aerial vehicle yaws at a low speed.

Figure 6:
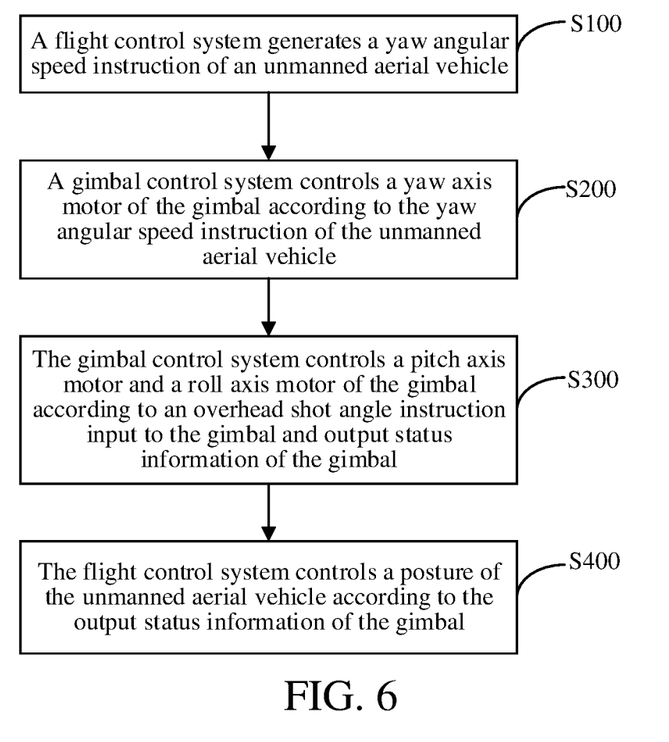
FIG. 6 is a flowchart of an embodiment of a method for controlling a gimbal of an unmanned aerial vehicle according to the present invention.

As shown in FIG. 6, the present invention further provides a method for controlling a gimbal, including:

S100. An FCS generates a yaw angular speed instruction of an unmanned aerial vehicle.

In an embodiment of the present invention, the yaw angular speed instruction of the unmanned aerial vehicle may be generated by the FCS of the unmanned aerial vehicle according to at least one of a position instruction and a velocity instruction that are input to the unmanned aerial vehicle. In other possible embodiments, the FCS may alternatively generate the yaw angular speed instruction of the unmanned aerial vehicle according to at least one of a sight instruction and a sight change rate instruction. In an embodiment of the present invention, any of the position instruction, the velocity instruction, the sight instruction and the sight change rate instruction may be input by a vision system, an intelligent control terminal, a remote control, or a navigation system of the unmanned aerial vehicle.

S200. A GCS controls a yaw axis motor of the gimbal according to the yaw angular speed instruction of the unmanned aerial vehicle.

Figure 7:
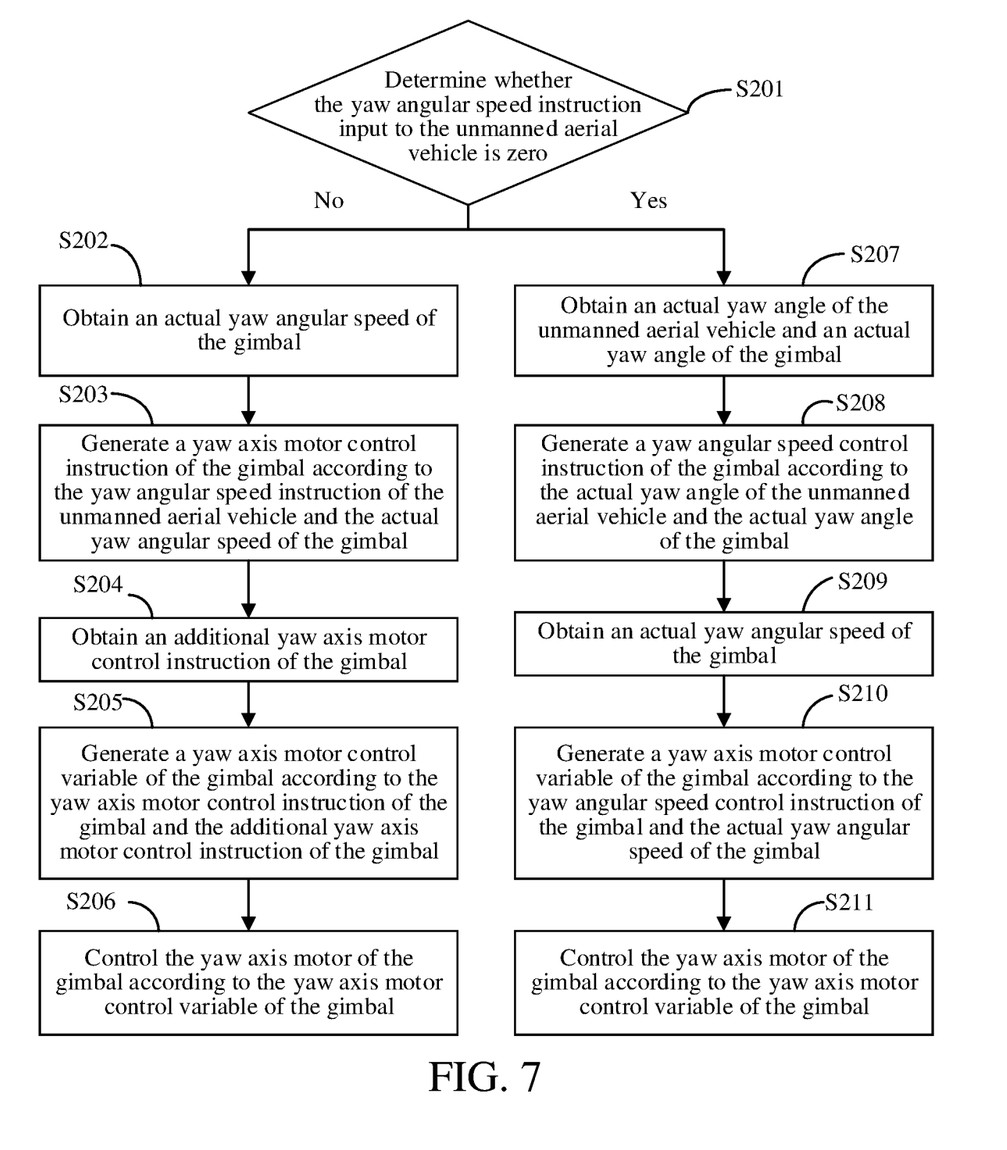
FIG. 7 is a flowchart of an embodiment of step S200 in the method shown in FIG. 6.

As shown in FIG. 7, in an embodiment of the present invention, the step further includes:

S201. Determine whether the yaw angular speed instruction input to the unmanned aerial vehicle is zero.

In an embodiment of the present invention, whether the yaw angular speed instruction input to the unmanned aerial vehicle is zero may be determined by the GCS of the unmanned aerial vehicle. Whether the yaw angular speed instruction of the unmanned aerial vehicle is zero determines a control law adopted by the GCS. Referring to FIG. 5, when the yaw angular speed instruction input to the unmanned aerial vehicle is not zero, a control permission of the yaw axis motor of the gimbal is given to the FCS of the unmanned aerial vehicle. A weight of a yaw angular speed error of the gimbal is relatively large, and a yaw angular error is only used for compensation, and has a low weight. When the yaw angular speed instruction input to the unmanned aerial vehicle is zero, the control permission of the yaw axis motor of the gimbal is given to the GCS, that is, the GCS directly controls the yaw axis motor of the gimbal, and the yaw axis motor of the gimbal is not affected by the FCS. It should be noted that regardless of the GCS selects a control law 1 or a control law 2, control permissions of a pitch axis motor and a roll axis motor of the gimbal always pertain to the GCS.

When the yaw angular speed instruction input to the unmanned aerial vehicle is not zero, the GCS performs step S202 to step S206.

S202. Obtain an actual yaw angular speed of the gimbal.

In an embodiment of the present invention, the actual yaw angular speed of the gimbal may be measured by an IMU of the gimbal. The IMU of the gimbal is generally mounted on the gimbal and in communication connection with the GCS. The actual yaw angular speed may be alternatively obtained by using output status information fed back by the gimbal. The output status information of the gimbal includes an actual posture angle and an actual posture angular speed of the gimbal, that is, an actual pitch angle, an actual pitch angular speed, an actual roll angle, an actual roll angular speed, an actual yaw angle and the actual yaw angular speed of the gimbal.

S203. Generate a yaw axis motor control instruction of the gimbal according to the yaw angular speed instruction input to the unmanned aerial vehicle and the actual yaw angular speed of the gimbal.

S204. Obtain an additional yaw axis motor control instruction of the gimbal.

In an embodiment of the present invention, the additional yaw axis motor control instruction of the gimbal refers to a difference between the actual yaw angle of the gimbal and an actual yaw angle of the unmanned aerial vehicle. The instruction may ensure that a sight of an imaging device mounted on the gimbal is in consistent with a heading or a sight of the unmanned aerial vehicle. The actual yaw angle of the gimbal may be measured by an IMU of the gimbal, or may be obtained by using output status information fed back by the gimbal. The actual yaw angle of the unmanned aerial vehicle may be measured by an IMU of the unmanned aerial vehicle, or may be obtained by using output status information fed back by the unmanned aerial vehicle. The output status information of the unmanned aerial vehicle includes an actual posture angle and an actual posture angular speed of the unmanned aerial vehicle, that is, an actual pitch angle, an actual pitch angular speed, an actual roll angle, an actual roll angular speed, the actual yaw angle and an actual yaw angular speed of the unmanned aerial vehicle.

S205. Generate a yaw axis motor control variable of the gimbal according to the yaw axis motor control instruction of the gimbal and the additional yaw axis motor control instruction of the gimbal.

S206. Control the yaw axis motor of the gimbal according to the yaw axis motor control variable of the gimbal.

When the yaw angular speed instruction input to the unmanned aerial vehicle is zero, step S207 to step S211 are performed.

S207. Obtain an actual yaw angle of the unmanned aerial vehicle and an actual yaw angle of the gimbal.

Similarly, the actual yaw angle of the unmanned aerial vehicle may be measured by the IMU of the unmanned aerial vehicle, or may be obtained by using output status information fed back by the unmanned aerial vehicle, and the actual yaw angle of the gimbal may be measured by the IMU of the gimbal, or may be obtained by using output status information fed back by the gimbal.

S208. Generate a yaw angular speed control instruction of the gimbal according to the actual yaw angle of the unmanned aerial vehicle and the actual yaw angle of the gimbal.

S209. Obtain an actual yaw angular speed of the gimbal.

S210. Generate a yaw axis motor control variable of the gimbal according to the yaw angular speed control instruction of the gimbal and the actual yaw angular speed of the gimbal.

S211. Control the yaw axis motor of the gimbal according to the yaw axis motor control variable of the gimbal.

In an embodiment of the present invention, the method further includes:

S300. The GCS controls a pitch axis motor and a roll axis motor of the gimbal according to an overhead shot angle instruction input to the gimbal and output status information of the gimbal, the output status information of the gimbal including an actual posture angle and an actual posture angular speed of the gimbal.

In an embodiment of the present invention, the actual posture angle of the gimbal includes an actual pitch angle, an actual roll angle and an actual yaw angle. The actual posture angular speed of the gimbal includes an actual pitch angular speed, an actual roll angular speed and an actual yaw angular speed.

In an embodiment of the present invention, an overhead shot angle instruction input to the gimbal may be transmitted by a remote control or an intelligent terminal. The remote control is configured to control the unmanned aerial vehicle and be in communication connection with the unmanned aerial vehicle. The intelligent terminal includes a mobile phone, a tablet computer, or the like. An app used to control the unmanned aerial vehicle is usually installed on the intelligent terminal.

Figure 8:
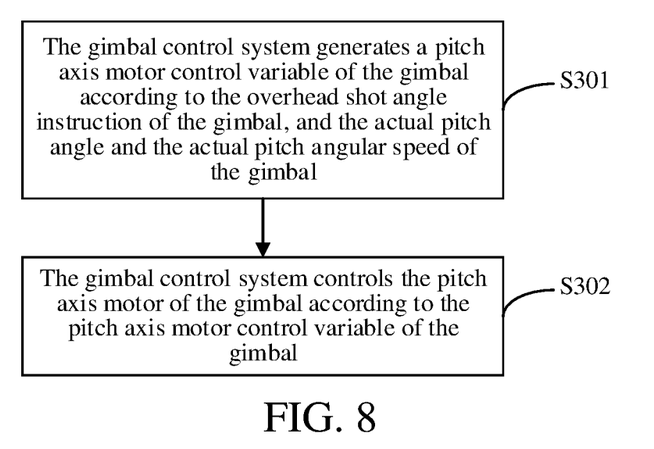
FIG. 8 is a flowchart of controlling, by a GCS, a pitch axis motor in step S300 in the method shown in FIG. 6.

As shown in FIG. 8, the controlling, by the GCS, a pitch axis motor of the gimbal according to an overhead shot angle instruction input to the gimbal and output status information of the gimbal includes:

S301. Generate a pitch axis motor control variable of the gimbal according to the overhead shot angle instruction of the gimbal, and the actual pitch angle and the actual pitch angular speed of the gimbal.

S302. Control the pitch axis motor of the gimbal according to the pitch axis motor control variable of the gimbal.

Figure 9:
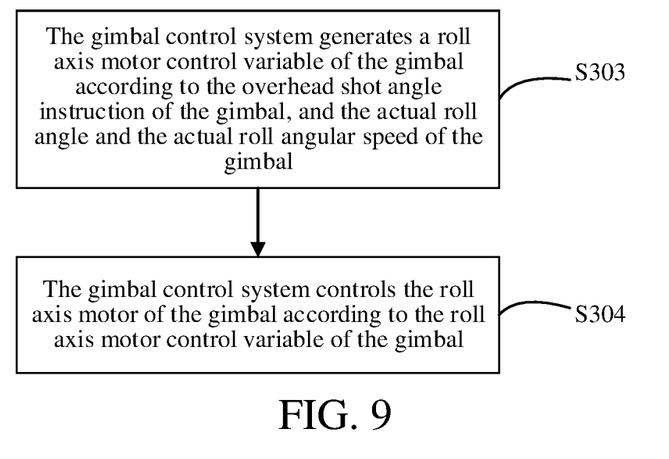
FIG. 9 is a flowchart of controlling, by a GCS, a roll axis motor in step S300 in the method shown in FIG. 6.

Similarly, the controlling, by the GCS, a roll axis motor of the gimbal includes:

S303. Generate a roll axis motor control variable of the gimbal according to the overhead shot angle instruction input to the gimbal, and the actual roll angle and the actual roll angular speed of the gimbal.

S304. Control the roll axis motor of the gimbal according to the roll axis motor control variable of the gimbal.

In an embodiment of the present invention, the method further includes:

S400. The FCS controls a posture of the unmanned aerial vehicle according to the output status information of the gimbal.

The posture of the unmanned aerial vehicle includes a posture angle of the unmanned aerial vehicle and a posture angular speed of the unmanned aerial vehicle.

Figure 10:
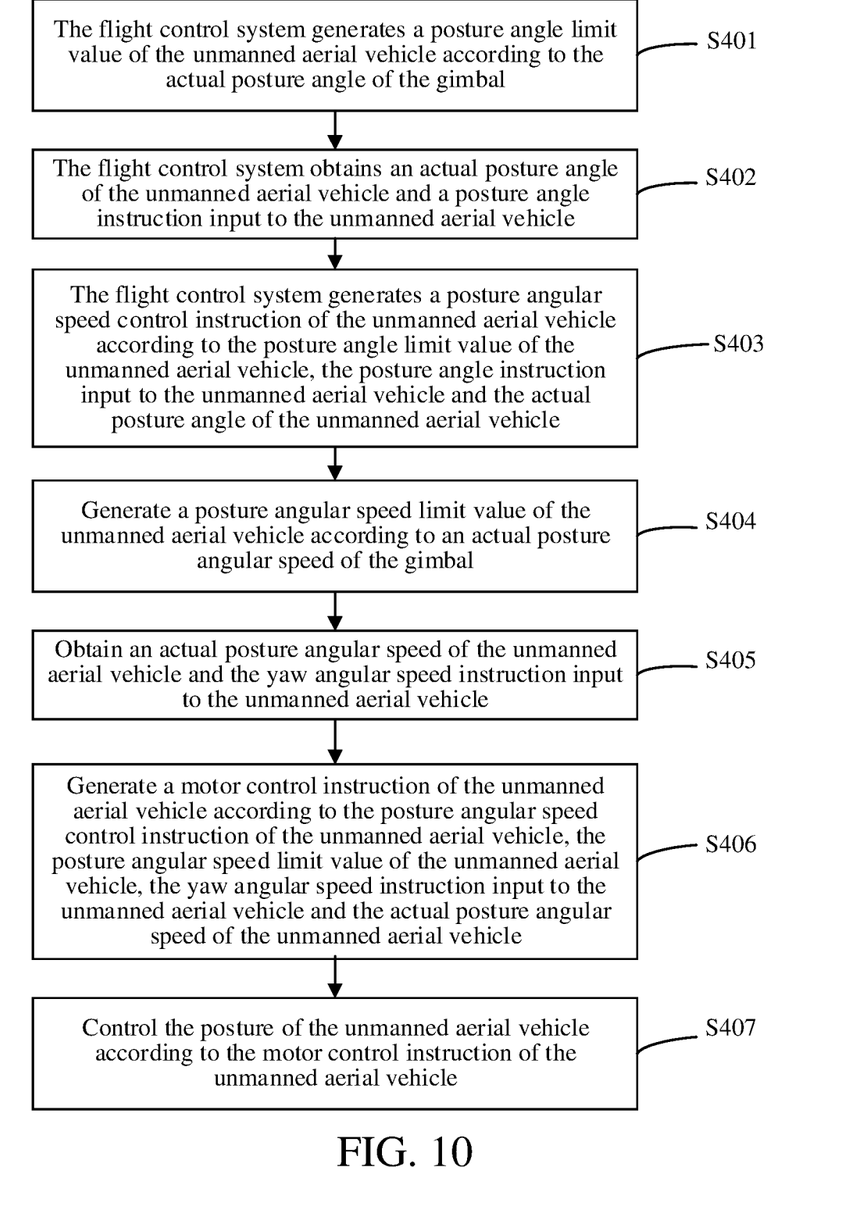
FIG. 10 is a flowchart of controlling, by an FCS, a posture of an unmanned aerial vehicle according to output status information of a GCS in step S400 in the method shown in FIG. 6.

As shown in FIG. 10, step S400 further includes:

S401. Generate a posture angle limit value of the unmanned aerial vehicle according to the actual posture angle of the gimbal.

In an embodiment of the present invention, the actual posture angle of the gimbal mainly includes an actual pitch angle and an actual roll angle of the gimbal. In other possible embodiments, the actual posture angle may further include an actual yaw angle of the gimbal. The actual posture angle of the gimbal may be obtained by using output status information fed back by the gimbal. Correspondingly, the posture angle limit value of the unmanned aerial vehicle mainly includes a pitch angle limit value and a roll angle limit value of the unmanned aerial vehicle, and may further include a yaw angle limit value of the unmanned aerial vehicle.

S402. Obtain an actual posture angle of the unmanned aerial vehicle and a posture angle instruction input to the unmanned aerial vehicle.

In an embodiment of the present invention, the actual posture angle of the unmanned aerial vehicle may be obtained by using output status information (including the actual posture angle and the actual posture angular speed) fed back by the unmanned aerial vehicle, or may be measured by the IMU of the unmanned aerial vehicle. The posture angle instruction of the unmanned aerial vehicle mainly includes a pitch angle instruction and a roll angle instruction that are input to the unmanned aerial vehicle. The pitch angle instruction and the roll angle instruction that are input to the unmanned aerial vehicle may be generated by the FCS according to at least one of a position instruction, a velocity instruction, a sight instruction, and a sight change rate instruction that are input to the unmanned aerial vehicle.

S403. Generate a posture angular speed control instruction of the unmanned aerial vehicle according to the posture angle limit value of the unmanned aerial vehicle, the posture angle instruction input to the unmanned aerial vehicle and the actual posture angle of the unmanned aerial vehicle.

The posture angle speed control instruction of the unmanned aerial vehicle mainly includes a pitch angular speed control instruction and a roll angular speed control instruction of the unmanned aerial vehicle.

S404. Generate a posture angular speed limit value of the unmanned aerial vehicle according to an actual posture angular speed of the gimbal.

The actual posture angular speed of the gimbal includes an actual pitch angular speed, an actual roll angular speed and an actual yaw angular speed of the gimbal. Therefore, the posture angular speed limit value of the unmanned aerial vehicle includes a pitch angular speed limit value, a roll angular speed limit value and a yaw angular speed limit value of the unmanned aerial vehicle.

S405. Obtain an actual posture angular speed of the unmanned aerial vehicle and the yaw angular speed instruction input to the unmanned aerial vehicle.

The yaw angular speed instruction input to the unmanned aerial vehicle may be obtained by using step S100.

S406. Generate a motor control instruction of the unmanned aerial vehicle according to the posture angular speed control instruction of the unmanned aerial vehicle, the posture angular speed limit value of the unmanned aerial vehicle, the yaw angular speed instruction input to the unmanned aerial vehicle and the actual posture angular speed of the unmanned aerial vehicle.

S407. Control the posture of the unmanned aerial vehicle according to the motor control instruction of the unmanned aerial vehicle.

For a detailed description of the method for controlling a gimbal in the present invention, reference may be made to the detailed description of the unmanned aerial vehicle embodiment.

In the method for controlling a gimbal in the present invention, joint control is performed by the GCS and the FCS, so that advantages of high-precision control and quick response of the GCS are maximized. The advantages are used for compensating for deficiencies of the FCS in yaw control, thereby improving the stability of a yaw channel of the gimbal, and completely resolving frame freezing of an aerial video when the unmanned aerial vehicle yaws at a low speed.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. The storage medium may be a magnetic disc, an optical disc, a read-only memory (ROM), or the like.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present invention, and their description is specific and detailed, but cannot therefore be understood as a limitation to the patent scope of the present invention. It should be noted that, a person of ordinary skill in the art may further make some variations and improvements without departing from the concept of the present invention, and the variations and improvements belong to the protection scope of the present invention. Therefore, the protection scope of the patent of the present invention shall be topic to the claims.

What is claimed is:

1. A method for controlling a gimbal of an unmanned aerial vehicle, wherein the unmanned aerial vehicle comprises a flight control system and a gimbal control system configured to control the gimbal, and the method comprises:
  generating, by the flight control system, a yaw angular speed instruction of the unmanned aerial vehicle; and
  controlling, by the gimbal control system, a yaw axis motor of the gimbal according to the yaw angular speed instruction of the unmanned aerial vehicle;
  wherein the controlling, by the gimbal control system, a yaw axis motor of the gimbal according to the yaw angular speed instruction of the unmanned aerial vehicle comprises:
  determining whether the yaw angular speed instruction input to the unmanned aerial vehicle is zero;
  when the yaw angular speed instruction input to the unmanned aerial vehicle is not zero, obtaining, by the gimbal control system, an actual yaw angular speed of the gimbal;
  generating, by the gimbal control system, a yaw axis motor control instruction of the gimbal according to the yaw angular speed instruction input to the unmanned aerial vehicle and the actual yaw angular speed of the gimbal;
  obtaining, by the gimbal control system, an additional yaw axis motor control instruction of the gimbal, the additional yaw axis motor control instruction being configured to control the yaw axis motor of the gimbal, to enable a sight of an imaging device mounted on the gimbal to coincide with a heading of the unmanned aerial vehicle;
  generating, by the gimbal control system, a yaw axis motor control variable of the gimbal according to the yaw axis motor control instruction of the gimbal and the additional yaw axis motor control instruction of the gimbal; and controlling the yaw axis motor of the gimbal according to the yaw axis motor control variable of the gimbal.

2. The method according to claim 1, wherein the obtaining, by the gimbal control system, an additional yaw axis motor control instruction of the gimbal comprises:
  obtaining, by the gimbal control system, an actual yaw angle of the gimbal and an actual yaw angle of the unmanned aerial vehicle; and
  generating, by the gimbal control system, the additional yaw axis motor control instruction of the gimbal according to the actual yaw angle of the gimbal and the actual yaw angle of the unmanned aerial vehicle.

3. The method according to claim 1, further comprising:
  if the yaw angular speed instruction input to the unmanned aerial vehicle is zero,
  obtaining, by the gimbal control system, an actual yaw angle of the unmanned aerial vehicle and an actual yaw angle of the gimbal;
  generating, by the gimbal control system, a yaw angular speed control instruction of the gimbal according to the actual yaw angle of the unmanned aerial vehicle and the actual yaw angle of the gimbal;
  obtaining, by the gimbal control system, an actual yaw angular speed of the gimbal;
  generating, by the gimbal control system, a yaw axis motor control variable of the gimbal according to the yaw angular speed control instruction of the gimbal and the actual yaw angular speed of the gimbal; and
  controlling, by the gimbal control system, the yaw axis motor of the gimbal according to the yaw axis motor control variable of the gimbal.

4. The method according to claim 1, wherein the generating, by the flight control system, a yaw angular speed instruction of the unmanned aerial vehicle comprises:
  obtaining, by the flight control system, at least one of a position instruction and a sight instruction that are input to the unmanned aerial vehicle; and
  generating, by the flight control system, the yaw angular speed instruction of the unmanned aerial vehicle according to at least one of the position instruction and the sight instruction that are input to the unmanned aerial vehicle.

5. The method according to claim 1, wherein the generating, by the flight control system, a yaw angular speed instruction of the unmanned aerial vehicle comprises:
  obtaining, by the flight control system, at least one of a velocity instruction and a sight change rate instruction that are input to the unmanned aerial vehicle; and
  generating, by the flight control system, the yaw angular speed instruction of the unmanned aerial vehicle according to at least one of the velocity instruction and the sight change rate instruction that are input to the unmanned aerial vehicle.

6. The method according to claim 1, further comprising:
  controlling, by the gimbal control system, a pitch axis motor and a roll axis motor of the gimbal according to an overhead shot angle instruction input to the gimbal and output status information of the gimbal, the output status information of the gimbal comprising an actual posture angle and an actual posture angular speed of the gimbal.

7. The method according to claim 6, wherein the actual posture angle of the gimbal comprises an actual pitch angle of the gimbal, and the actual posture angular speed of the gimbal comprises an actual pitch angular speed of the gimbal; and
  the controlling, by the gimbal control system, a pitch axis motor and a roll axis motor of the gimbal according to an overhead shot angle instruction input to the gimbal and output status information of the gimbal comprises:
  generating, by the gimbal control system, a pitch axis motor control variable of the gimbal according to the overhead shot angle instruction of the gimbal, and the actual pitch angle and the actual pitch angular speed of the gimbal; and
  controlling the pitch axis motor of the gimbal according to the pitch axis motor control variable of the gimbal.

8. The method according to claim 7, wherein the actual posture angle of the gimbal further comprises an actual roll angle of the gimbal, and the actual posture angular speed of the gimbal further comprises an actual roll angular speed of the gimbal; and
  the controlling, by the gimbal control system, a pitch axis motor and a roll axis motor of the gimbal according to an overhead shot angle instruction input to the gimbal and output status information of the gimbal comprises:
  generating, by the gimbal control system, a roll axis motor control variable of the gimbal according to the overhead shot angle instruction of the gimbal, and the actual roll angle and the actual roll angular speed of the gimbal; and
  controlling, by the gimbal control system, the roll axis motor of the gimbal according to the roll axis motor control variable of the gimbal.

9. The method according to claim 6, further comprising:
  obtaining, by the gimbal control system, the overhead shot angle instruction of the gimbal transmitted by a remote control or an intelligent terminal.

10. The method according to claim 6, further comprising:
controlling, by the flight control system, a posture of the unmanned aerial vehicle according to the output status information of the gimbal.

11. The method according to claim 10, wherein the controlling, by the flight control system, a posture of the unmanned aerial vehicle according to the output status information of the gimbal comprises:
generating, by the flight control system, a posture angle limit value of the unmanned aerial vehicle according to the actual posture angle of the gimbal;
obtaining, by the flight control system, an actual posture angle of the unmanned aerial vehicle and a posture angle instruction input to the unmanned aerial vehicle;
generating, by the flight control system, a posture angular speed control instruction of the unmanned aerial vehicle according to the posture angle limit value of the unmanned aerial vehicle, the posture angle instruction input to the unmanned aerial vehicle and the actual posture angle of the unmanned aerial vehicle;
generating, by the flight control system, a posture angular speed limit value of the unmanned aerial vehicle according to the actual posture angular speed of the gimbal;
obtaining, by the flight control system, an actual posture angular speed of the unmanned aerial vehicle and the yaw angular speed instruction input to the unmanned aerial vehicle;
generating, by the flight control system, a motor control instruction of the unmanned aerial vehicle according to the posture angular speed control instruction of the unmanned aerial vehicle, the posture angular speed limit value of the unmanned aerial vehicle, the yaw angular speed instruction input to the unmanned aerial vehicle and the actual posture angular speed of the unmanned aerial vehicle; and
controlling, by the flight control system, the posture of the unmanned aerial vehicle according to the motor control instruction of the unmanned aerial vehicle.

12. An unmanned aerial vehicle, comprising:
a body;
an arm, connected to the body;
a power apparatus, disposed on the arm;
a gimbal, connected to the body;
a flight control system, disposed on the body; and
a gimbal control system, disposed on the gimbal or the body and configured to control the gimbal,
the flight control system being configured to generate a yaw angular speed instruction of the unmanned aerial vehicle; and
the gimbal control system being configured to:
control a yaw axis motor of the gimbal according to the yaw angular speed instruction of the unmanned aerial vehicle generated by the flight control system;
wherein the gimbal control system is specifically configured to: determine whether the yaw angular speed of the unmanned aerial vehicle is zero;
when the yaw angular speed instruction of the unmanned aerial vehicle is not zero obtain an actual yaw angular speed of the gimbal;
generate a yaw axis motor control instruction of the gimbal according to the yaw angular speed instruction input to the unmanned aerial vehicle and the actual yaw angular speed of the gimbal;
obtain an additional yaw axis motor control instruction of the gimbal, the additional yaw axis motor control instruction being used to control the yaw axis motor of the gimbal, to enable a sight of an imaging device mounted on the gimbal to coincide with a heading of the unmanned aerial vehicle;
generate a yaw axis motor control variable of the gimbal according to the yaw axis motor control instruction of the gimbal and the additional yaw axis motor control instruction of the gimbal; and
control the yaw axis motor of the gimbal according to the yaw axis motor control variable of the gimbal.

13. The unmanned aerial vehicle according to claim 12, wherein the gimbal control system is specifically configured to:
obtain an actual yaw angle of the gimbal and an actual yaw angle of the unmanned aerial vehicle; and
generate the additional yaw axis motor control instruction of the gimbal according to the actual yaw angle of the gimbal and the actual yaw angle of the unmanned aerial vehicle.

14. The unmanned aerial vehicle according to claim 12 wherein when the yaw angular speed instruction input to the unmanned aerial vehicle is zero, the gimbal control system is further configured to:
obtain an actual yaw angle of the unmanned aerial vehicle and an actual yaw angle of the gimbal;
generate a yaw angular speed control instruction of the gimbal according to the actual yaw angle of the unmanned aerial vehicle and the actual yaw angle of the gimbal;
obtain an actual yaw angular speed of the gimbal;
generate a yaw axis motor control variable of the gimbal according to the yaw angular speed control instruction of the gimbal and the actual yaw angular speed of the gimbal; and
control the yaw axis motor of the gimbal according to the yaw axis motor control variable of the gimbal.

15. The unmanned aerial vehicle according to claim 12, wherein the flight control system is specifically configured to:
obtain at least one of a position instruction and a sight instruction of the unmanned aerial vehicle; and
generate the yaw angular speed instruction of the unmanned aerial vehicle according to at least one of the position instruction and the sight instruction of the unmanned aerial vehicle.

16. The unmanned aerial vehicle according to claim 12, wherein the flight control system is specifically configured to:
obtain at least one of a velocity instruction and a sight change rate instruction of the unmanned aerial vehicle; and
generate the yaw angular speed instruction of the unmanned aerial vehicle according to at least one of the velocity instruction and the sight change rate instruction of the unmanned aerial vehicle.

17. The unmanned aerial vehicle according to claim 12, wherein the gimbal control system is further configured to:
control a pitch axis motor and a roll axis motor of the gimbal according to an overhead shot angle instruction input to the gimbal and output status information of the gimbal, the output status information of the gimbal comprising an actual posture angle and an actual posture angular speed of the gimbal.

18. The unmanned aerial vehicle according to claim 17, wherein the gimbal control system is specifically configured to:
generate a pitch axis motor control variable of the gimbal according to the overhead shot angle instruction of the gimbal, and the actual pitch angle and the actual pitch angular speed of the gimbal; and control the pitch axis motor of the gimbal according to the pitch axis motor control variable of the gimbal.

19. The unmanned aerial vehicle according to claim 18, wherein the gimbal control system is further configured to:

generate a roll axis motor control variable of the gimbal according to the overhead shot angle instruction of the gimbal, and an actual roll angle and an actual roll angular speed of the gimbal; and control the roll axis motor of the gimbal according to the roll axis motor control variable of the gimbal.

20. The unmanned aerial vehicle according to claim 17, wherein the gimbal control system is specifically configured to obtain the overhead shot angle instruction of the gimbal transmitted by a remote control or an intelligent terminal.

21. The unmanned aerial vehicle according to claim 17, wherein the flight control system is further configured to:

control a posture of the unmanned aerial vehicle according to the output status information of the gimbal.

22. The unmanned aerial vehicle according to claim 21, wherein the flight control system is specifically configured to:

generate a posture angle limit value of the unmanned aerial vehicle according to the actual posture angle of the gimbal;

obtain an actual posture angle of the unmanned aerial vehicle and a posture angle instruction input to the unmanned aerial vehicle;

generate a posture angular speed control instruction of the unmanned aerial vehicle according to the posture angle limit value of the unmanned aerial vehicle, the posture angle instruction input to the unmanned aerial vehicle and the actual posture angle of the unmanned aerial vehicle;

generate a posture angular speed limit value of the unmanned aerial vehicle according to the actual posture angular speed of the gimbal;

obtain an actual posture angular speed of the unmanned aerial vehicle and the yaw angular speed instruction input to the unmanned aerial vehicle;

generate a motor control instruction of the unmanned aerial vehicle according to the posture angular speed control instruction of the unmanned aerial vehicle, the posture angular speed limit value of the unmanned aerial vehicle, the yaw angular speed instruction input to the unmanned aerial vehicle and the actual posture angular speed of the unmanned aerial vehicle; and control the posture of the unmanned aerial vehicle according to the motor control instruction of the unmanned aerial vehicle.

* * * * *